(12) United States Patent
Parker et al.

(10) Patent No.: US 10,631,470 B2
(45) Date of Patent: Apr. 28, 2020

(54) GARDEN LAYOUT GROWING SYSTEM

(71) Applicants: Christopher Jon Parker, Cable, WI (US); Amy Lynn Parker, Cable, WI (US)

(72) Inventors: Christopher Jon Parker, Cable, WI (US); Amy Lynn Parker, Cable, WI (US)

(73) Assignee: Christopher Jon Parker, Cable, WI (US)

( * ) Notice: Subject to any disclaimer, the term of this patent is extended or adjusted under 35 U.S.C. 154(b) by 323 days.

(21) Appl. No.: 15/636,485

(22) Filed: Jun. 28, 2017

(65) Prior Publication Data

US 2018/0000021 A1    Jan. 4, 2018

Related U.S. Application Data

(60) Provisional application No. 62/493,368, filed on Jul. 1, 2016.

(51) Int. Cl.
| | | |
|---|---|---|
| *A01G 9/20* | (2006.01) | |
| *A01G 25/00* | (2006.01) | |
| *A01G 13/02* | (2006.01) | |
| *A01G 9/14* | (2006.01) | |
| *A01G 9/02* | (2018.01) | |

(52) U.S. Cl.
CPC ............... *A01G 9/20* (2013.01); *A01G 9/027* (2013.01); *A01G 9/028* (2013.01); *A01G 9/14* (2013.01); *A01G 13/0281* (2013.01); *A01G 25/00* (2013.01)

(58) Field of Classification Search
CPC .......... A01G 9/20; A01G 9/027; A01G 9/028; A01G 9/14; A01G 13/0281; A01G 25/00
See application file for complete search history.

(56) References Cited

U.S. PATENT DOCUMENTS

| | | |
|---|---|---|
| 3,287,851 A | 11/1966 | Cramer |
| 3,305,969 A | 2/1967 | Mattson |
| 3,896,586 A | 7/1975 | Caldwell |
| 4,268,992 A | 5/1981 | Scharf, Sr. |
| 4,308,688 A | 1/1982 | Revane |
| 4,317,309 A | 3/1982 | Sheldon |
| 4,642,938 A * | 2/1987 | Georges ............ A01G 13/0237 47/2 |
| 4,648,203 A | 3/1987 | Worzek |

(Continued)

OTHER PUBLICATIONS

"Tomato & Pepper Automator Trays", "retrieved Jun. 28, 2017 from www.burpee.com/customer.../tomato-and-pepper-automator-trays-prod001247.html", , p. 1.

(Continued)

*Primary Examiner* — Joshua D Huson
(74) *Attorney, Agent, or Firm* — Fogg & Powers LLC

(57) ABSTRACT

A garden layout growing system is provided. The system includes a frame and at least a first tray and a second tray. At least one leg extends from the frame. The at least one leg is configured to be received within a growing medium to hold the frame at a select location in relation to the growing medium. Each first and second tray has at least a portion of a first edge that forms at least a portion of at least one plant opening and at least at portion of a second edge that is configured and arranged to be removably attached to the frame.

13 Claims, 17 Drawing Sheets

(56) References Cited

U.S. PATENT DOCUMENTS

| | | | |
|---|---|---|---|
| 4,972,628 A | 11/1990 | Smith | |
| 5,085,001 A | 2/1992 | Crawley | |
| 5,323,557 A | 6/1994 | Sonntag | |
| 5,396,731 A | 3/1995 | Byrne | |
| 5,522,176 A | 6/1996 | Suttle | |
| 5,709,049 A | 1/1998 | Baird | |
| 6,178,690 B1 | 1/2001 | Yoshida et al. | |
| 6,276,869 B1 | 8/2001 | Yakushinji | |
| 6,705,044 B2 | 3/2004 | Clancey | |
| 7,160,054 B2 | 1/2007 | Smiley | |
| 8,296,995 B1* | 10/2012 | Georges | A01G 13/0243 47/20.1 |
| 9,750,201 B2* | 9/2017 | Brown | A01G 13/0281 |
| 2007/0199240 A1* | 8/2007 | Koessler | A01G 13/02 47/31.1 |
| 2008/0236041 A1* | 10/2008 | Carpenter | E04D 11/002 47/65.9 |
| 2008/0256855 A1* | 10/2008 | Helmy | A01G 13/0281 47/33 |
| 2011/0067325 A1* | 3/2011 | Modica | A01G 9/027 52/173.1 |
| 2014/0083001 A1* | 3/2014 | Alcov | A01M 29/24 47/20.1 |
| 2017/0181385 A1* | 6/2017 | Daniel | A01G 9/12 |

OTHER PUBLICATIONS

"The Garden Patch GrowBox", "retrieved Jun. 28, 2017 from www.agardenpatch.com", , pp. 1-4.

* cited by examiner

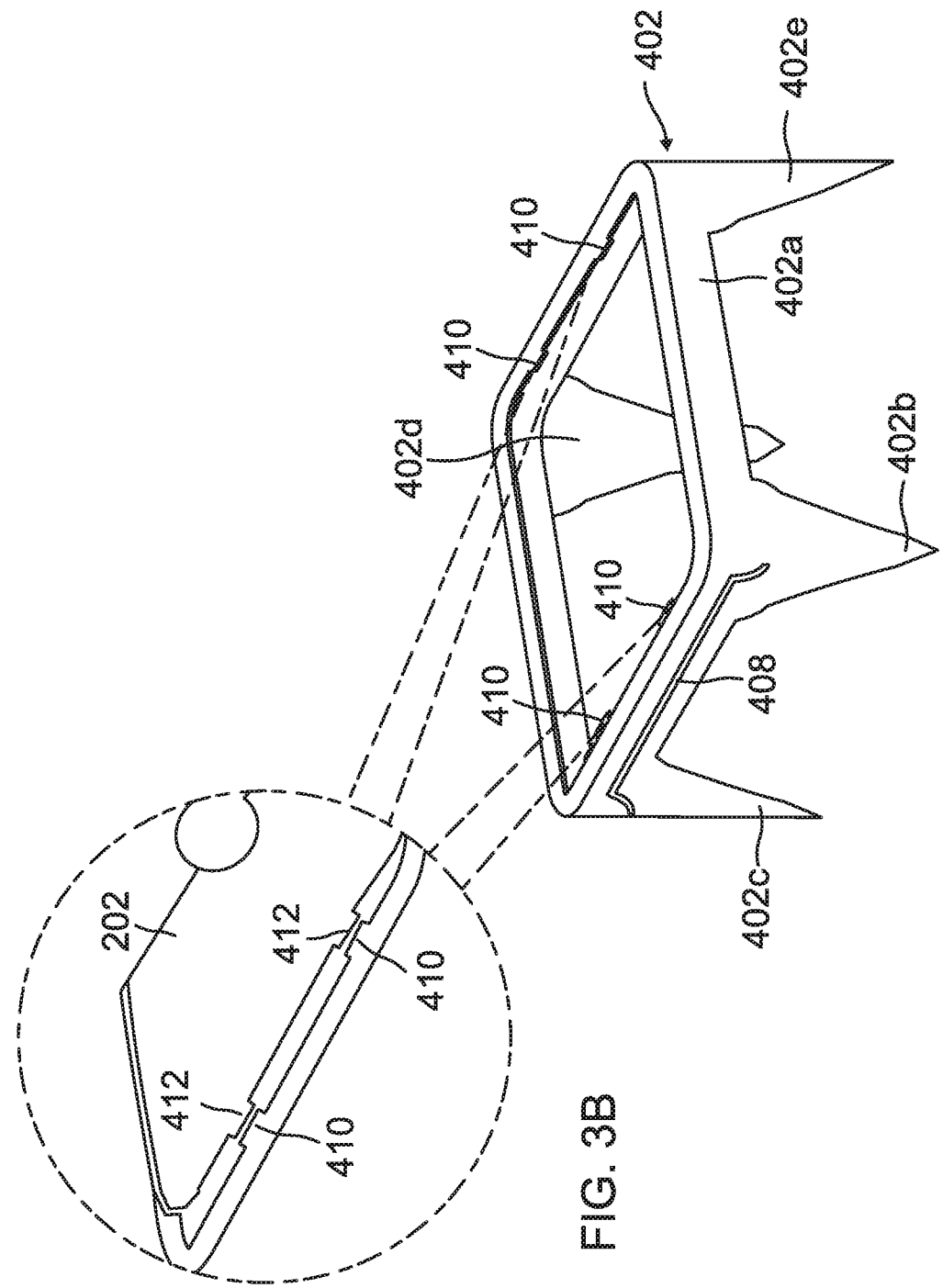

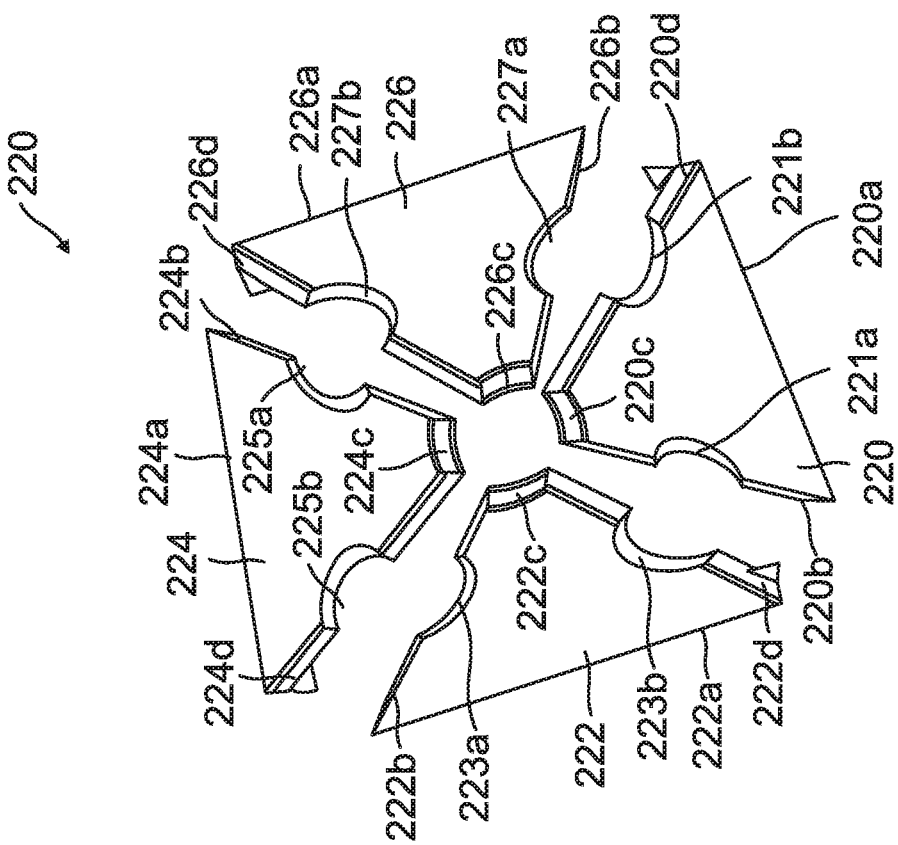
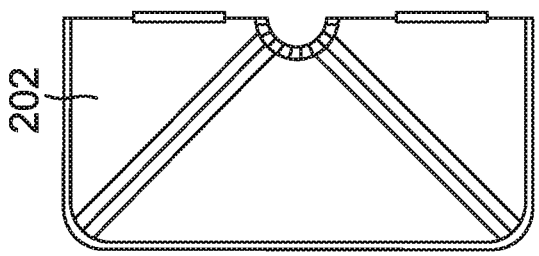
FIG. 4B
FIG. 4A

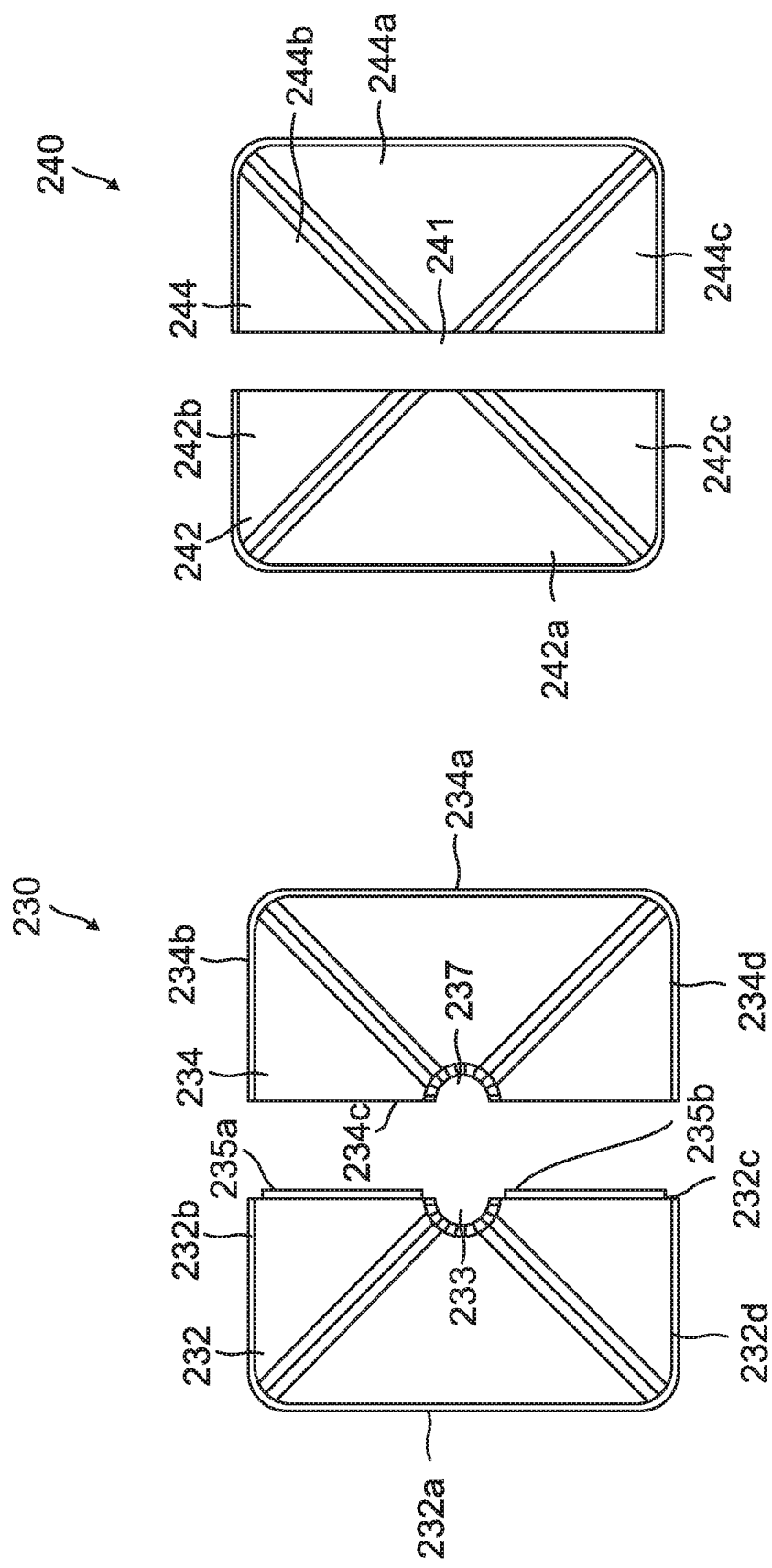

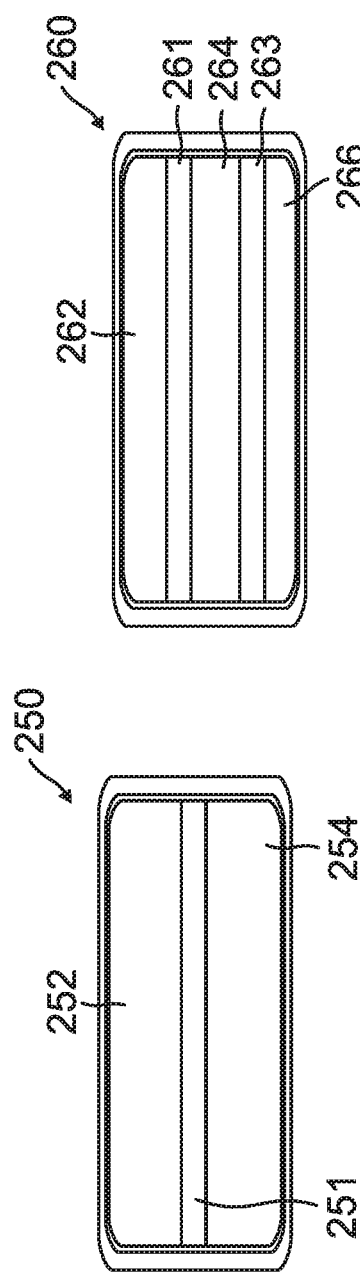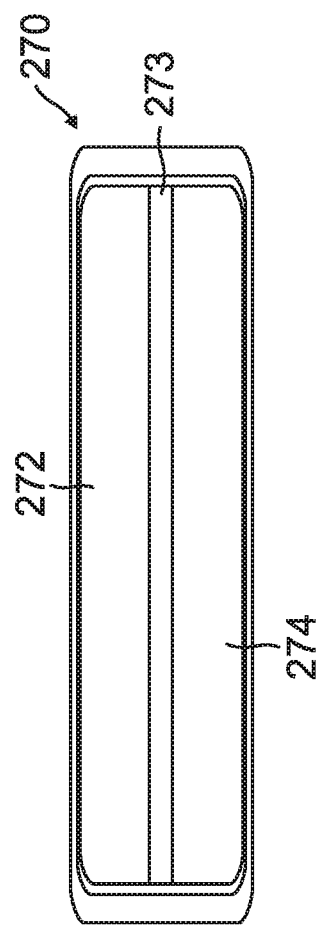

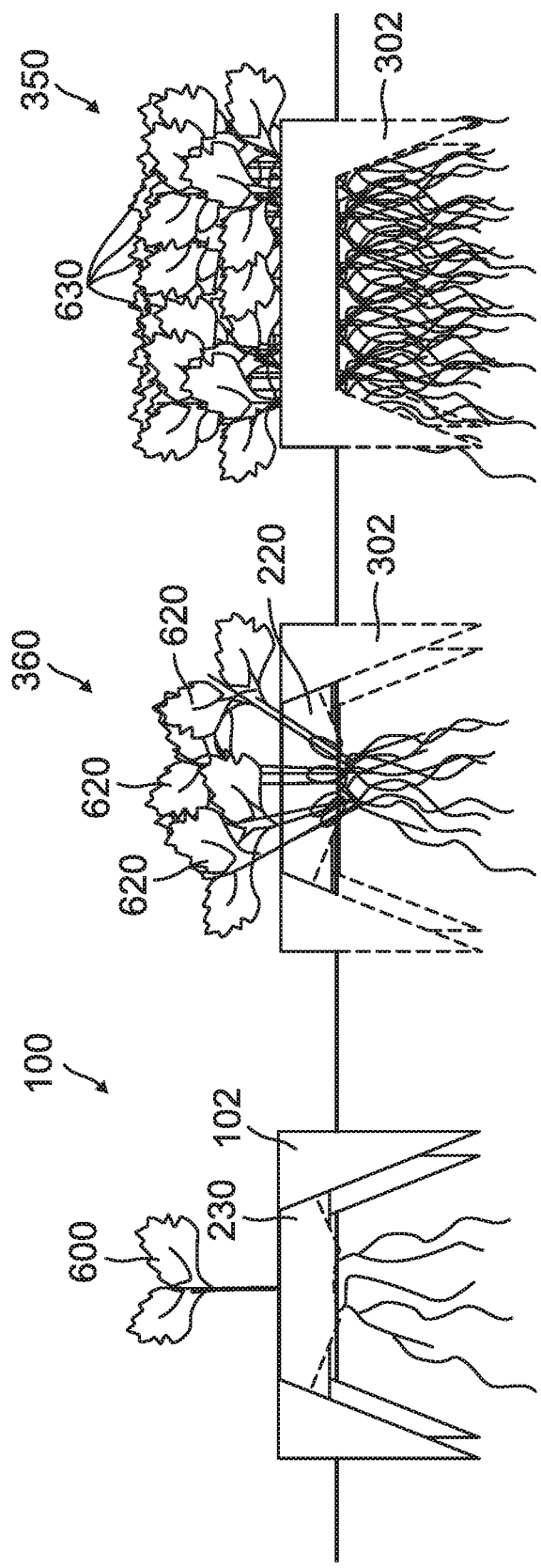

GARDEN LAYOUT GROWING SYSTEM

CROSS-REFERENCE TO RELATED APPLICATIONS

This application claims priority to U.S. Provisional Application Ser. No. 62/493,368, same title herewith, filed on Jul. 1, 2016, which is incorporated in its entirety herein by reference.

BACKGROUND

Growing plants takes a commitment of time and effort needed weed and water the plants in order for them to grow properly. One method of reducing the amount of time needed to weed is with use herbicides to chemically kill the weeds. However, the use of chemicals for weed control is not appealing to many growers. Moreover, many consumers of vegetables prefer their vegetables to be organic so they are not exposed to chemicals such as herbicides and pesticides. In addition, the conservation of water is a concern as more and more food is needed to feed a growing population.

SUMMARY

The following summary is made by way of example and not by way of limitation. It is merely provided to aid the reader in understanding some of the aspects of the subject matter described. Embodiments provide a system that aids in plant growth while suppressing weeds without the use of chemicals and extensive physical weeding.

In one embodiment, a garden layout growing system is provided. The system includes a frame and at least a first tray and a second tray. At least one leg extends from the frame. The at least one leg is configured to be received within a growing medium to hold the frame at a select location in relation to the growing medium. Each first and second tray has at least a portion of a first edge that forms at least a portion of at least one plant opening and at least at portion of a second edge that is configured and arranged to be removably attached to the frame.

In another example embodiment, another garden layout growing system including a frame and a tray assembly is provided. At least one leg extends from the frame. The at least one leg is configured to be received within a growing medium to hold the frame at a select location in relation to the growing medium. The tray assembly has at least one plant opening. The tray assembly has an outer edge that is configured and arranged to be selectively attached to the frame. The tray assembly has a slope between the outer edge to the at least one plant opening when attached to the frame. The tray assembly is configured and arranged to have a first configuration and a second configuration when attached to the frame. The first configuration causes moisture to be directed towards the at least one plant opening and the second configuration causes the moisture to be directed away from the at least one plant opening.

In yet another embodiment, a tray assembly for a garden layout growing system is provided. The tray assembly includes at least a first tray and at least a second tray. Each first and second tray has at least a portion of a first edge that forms at least a portion of at least one plant opening and at least at portion of a second edge that is configured and arranged to be selectively coupled to a frame.

BRIEF DESCRIPTION OF THE DRAWINGS

FIG. 3A is a side perspective view of the frame of FIG. 2C;

FIG. 3B is a close up view of a tray portion being aligned up to be engaged with the frame of FIG. 2C;

FIG. 4A is a top view of the tray portions that make up the tray assembly of FIG. 3D;

FIG. 4B is a top view of tray portions that make up a tray assembly of one exemplary embodiment;

FIG. 4C is a top view of tray portions that make up another tray assembly of one exemplary embodiment;

FIG. 4D is a top view of tray portions that make up still another tray assembly of one exemplary embodiment;

FIG. 4E is a top view of a tray assembly on a frame of one exemplary embodiment;

FIG. 4F is a top view of another tray assembly on a frame of one exemplary embodiment;

FIG. 4G is a top view of still another tray assembly on a frame of one exemplary embodiment;

FIG. 7A is a side perspective view of tray assembly of FIG. 4C in use;

FIG. 7B is a side perspective view of tray assembly of FIG. 4B is use;

FIG. 7C is a side perspective view of tray assembly of FIG. 4D is use;

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a modular growing system that provides custom garden ground protection including soil compaction protection, promotion of condensation and weed suppression while allowing earth working and plant cultivation. Embodiments of the growing system also have the ability to retain in-soil moisture and to selectively position the distribution of moisture near the plants therein allowing less water needing to be used throughout the growing season. Moreover, some embodiments of the growing system allows for a configuration that allows moisture to be directed away from plants when an oversaturation situation occurs. In addition embodiments of the growing system may maintain desired spacing between plants therein allowing each plants its own area to grow. Embodiments are designed to be placed and removed each growing season if desired. Some embodiments are designed to be stacked to reduce storage volume when not in use. Embodiments may be made from various materials that enable shape retention and durability for lasting use. In one embodiment the material is made of a plastic material.

Figure 1:
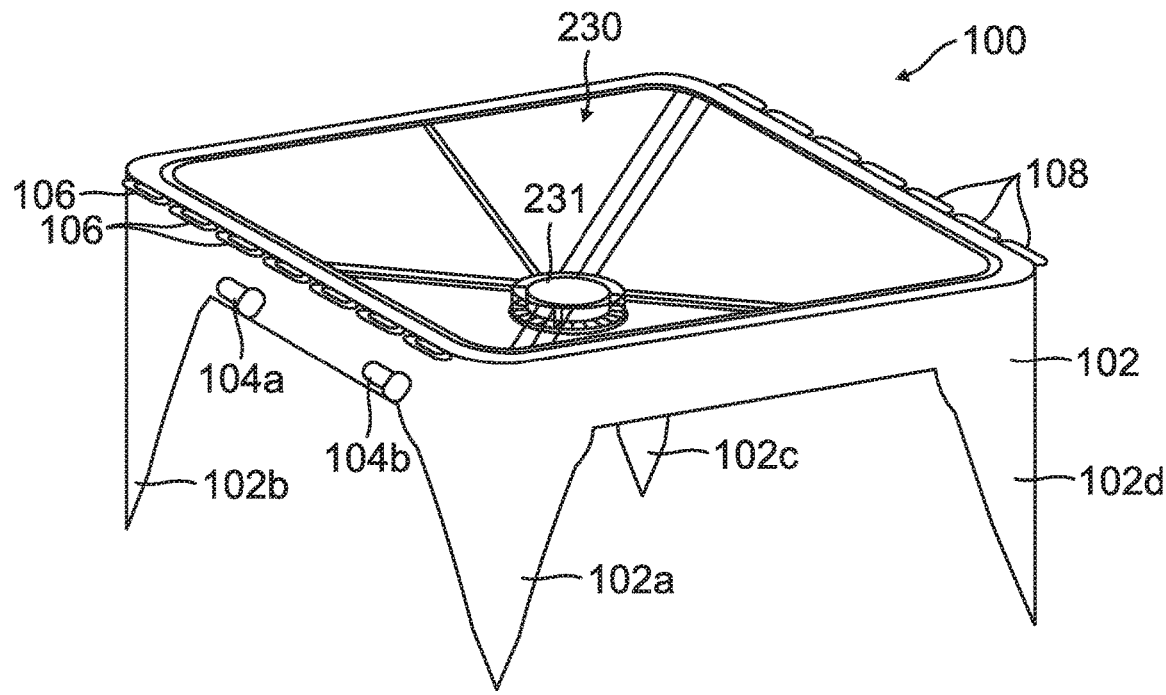
FIG. 1 is a side perspective view of garden layout growing system according to one exemplary embodiment.
Figure 2A:
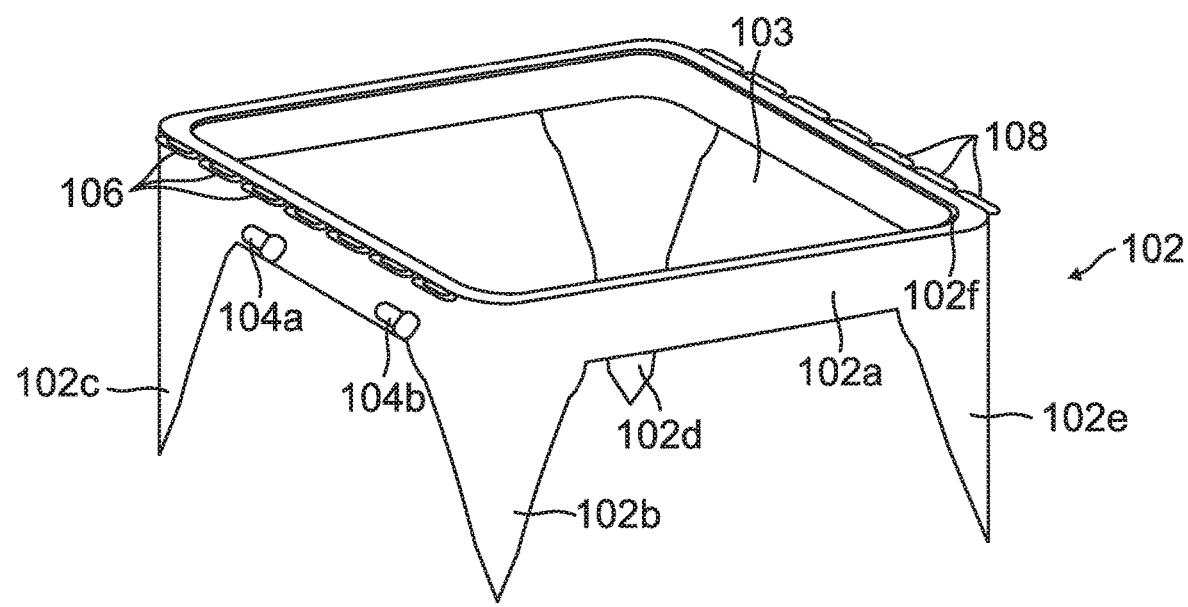
FIG. 2A is a side perspective view of a frame according to one exemplary embodiment.

Referring to FIG. 1, growing system 100 of one embodiment is illustrated. This embodiment includes a frame 102 and a tray assembly 230. The tray assembly 230 forms a plant passage 231 upon which a plant can grow through. The frame 102 of this embodiment is further illustrated in FIG. 2A. The frame 102 includes a frame base 102a that has an inner frame opening 103. Four legs 102b, 102c, 102d and 104e extend from a bottom edge of the base 102a proximate corners of the base 102a. The legs in some embodiments are designed to be inserted in a growing medium to hold the frame 102 in a static location in relation to the growing medium. Proximate a top edge of the base 102a is an inner perimeter track 102f upon which edge portions of the tray assembly 230 are received when in place in this exemplary embodiment. In one embodiment, the track 102f may include a ledge that aids in the placement of the tray assembly 230 portions in relation to the frame 102. Moreover other types of connecting arrangements may be used, such as but not limited to, male/female type and tongue and groove arrangements, to couple the panels of the tray assembly 230 to the frame 102. Hence, some embodiments are not limited to a track attaching configuration.

At least along one outer side of the frame 102a is at least one frame attachment slot 106. This example embodiment includes a plurality of the frame attaching slots 106 proximate the top edge of the frame body 102a. At least along another outer side edge is at least one frame connector tab 108. This example embodiment includes a plurality of frame connector tabs 108 proximate the top edge of the frame body 102a. The frame attaching slots 106 are designed to selectively engage frame connector tabs 108 of another frame body to couple a first frame to a second frame. Other types of attachment systems with different first and second type connection members may be used to attach frames together including, but not limited to, other types of male/female type and tongue and groove arrangements. The coupling of frames bodies together to expand a designated planting area is further discussed in detail below. Frame 102a is further illustrated as having a water hose passages 104a and 104b. The water hose passages 104a and 104b are illustrated as passing through a side of the frame 102a. In other embodiments, the water hose passages 104a and 104b also pass through the remaining sides of the frame 102a. The water hose passages 104a and 104b are designed to hold a water hose (such as a soaker hose) in place in relation to the respective frame body 102a to deliver water to one or more associated plants.

Figure 2B:
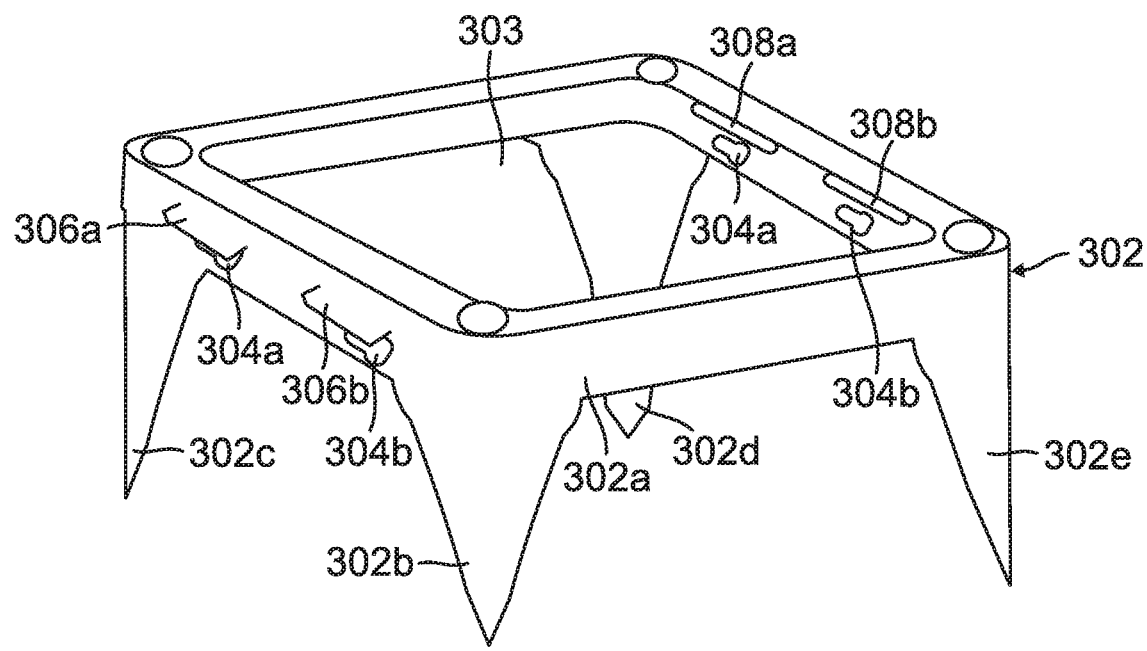
FIG. 2B is a side perspective view of another frame according to an exemplary embodiment.

A frame 302 of another embodiment is illustrated in FIG. 2B. The frame 302 in this embodiment includes a frame body 302a with a central frame opening 303. Four legs 302b, 302c, 302d and 302e extend down from the frame body 302a proximate corners of the frame body 302a. This embodiment include two frame connecting tabs 306a and 306b extending from a side of the frame body 302a and two frame attachment slots 308a and 308b in an opposite side of the frame body 302a. Like the previous embodiment, the connecting members made up of the frame connection tabs 306a and 306b and the frame attachment slots 308a and 308b, in this example embodiment, are used to selectively couple two or more frames 302 together. Frame body 302a, further includes water hose passages 304a and 304b through a first side and a second opposite side of the frame body 302a.

Figure 2C:
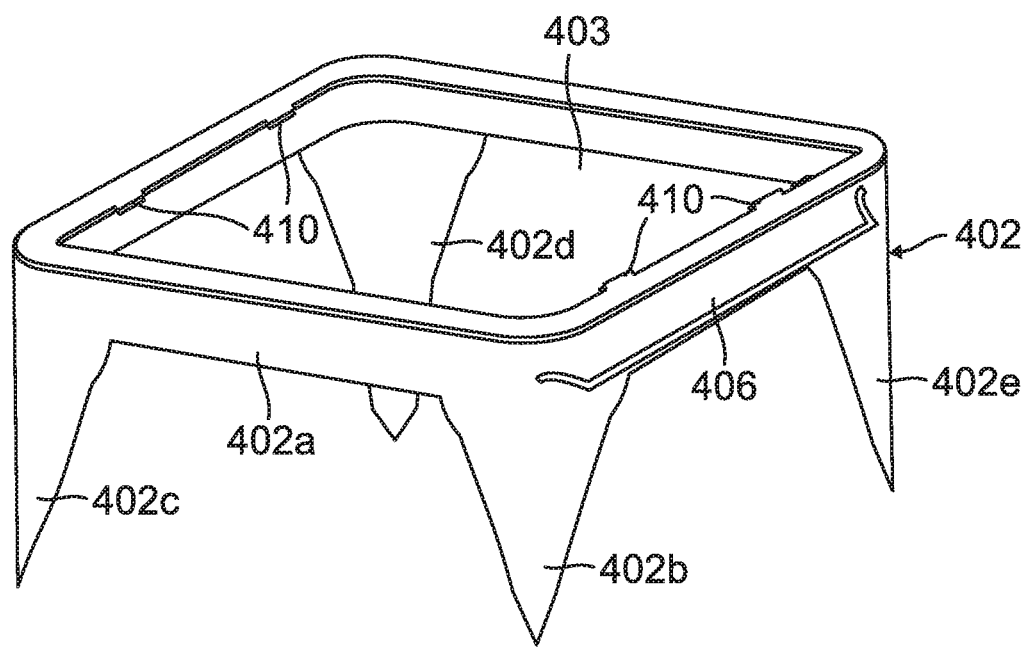
FIG. 2C is a side perspective view of still another frame according to an exemplary embodiment.

Another frame 402 of an embodiment is illustrated in FIG. 2C. Frame 402 in this embodiment includes a frame body 402a with a central frame opening 403. Four legs 402b, 402c, 402d and 402e extend down from the frame body 402a proximate corners of the frame body 402a. This embodiment include a single frame connecting tab 406 extending from a side of the frame body 402a. The frame body 402a also includes a frame attachment slot 408 (best illustrated in FIG. 3A) in an opposite side of the frame body 402a. Like the previous embodiment, the connecting members made up of the frame connection tab 406 and the frame attachment slot 408, in this example embodiment, are used to selectively couple two or more frames 402 together. Frame body 402a, further includes tray retaining slots 410 position around the inner perimeter defining the central frame opening in a spaced fashion. The tray retaining slots are used in this embodiment to hold a tray assembly in a static position in relation to the frame body 402a of the frame 402.

Figure 2D:
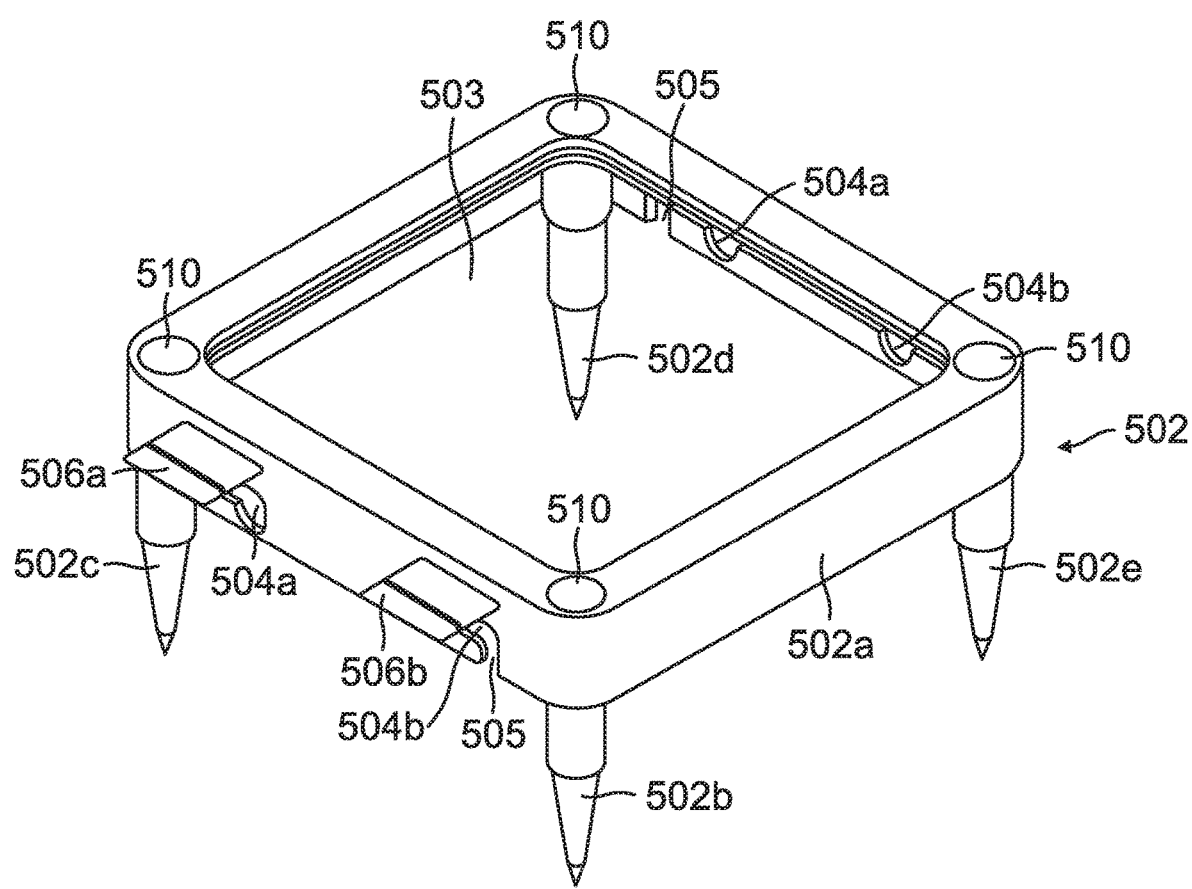
FIG. 2D is a side perspective view of yet another frame according to an exemplary embodiment.

Still another example of a frame 502 of an embodiment is illustrated in FIG. 2D. The frame 502 in this embodiment includes a frame body 502a with a central frame opening 503. Four legs 502b, 502c, 502d and 502e extend down from the frame body 502a proximate corners of the frame body 502a. This embodiment includes a first frame connecting tab 506a and a second frame connecting tab 506b that extend from a side of the frame body 502a. The frame body 502a also includes a first frame attachment slot 508a and a second frame attachment slot 509b (best illustrated in FIG. 11C) in an opposite side of the frame body 502a. Like the previous embodiment, the connecting members made up of the first and second frame connection tabs 506a and 506b and the first and second frame attachment slots 508a and 508b, in this embodiment, are used to selectively couple two or more frames 502 together. Frame body 502a, further includes a water hose passages 504a and 504b through a first side and a second opposite side of the frame body 502a. In this example embodiment, openings 505 to the respective water hose passages 504a and 504b from a bottom edge of the sides of the frame body 502a allow for the watering hose to be received with the respective water hose passage without having to thread the watering hose through the water hose passages 504a. This example embodiment also includes stacking bores 510 that extend inward from an upper surface of the frame into each respective leg 502b, 502c, 502d and 502e. The stacking bores 510 are used when stacking multiple frames 502 during storage. Use of the stacking bores 510 is further described in detail below.

Figure 3C:
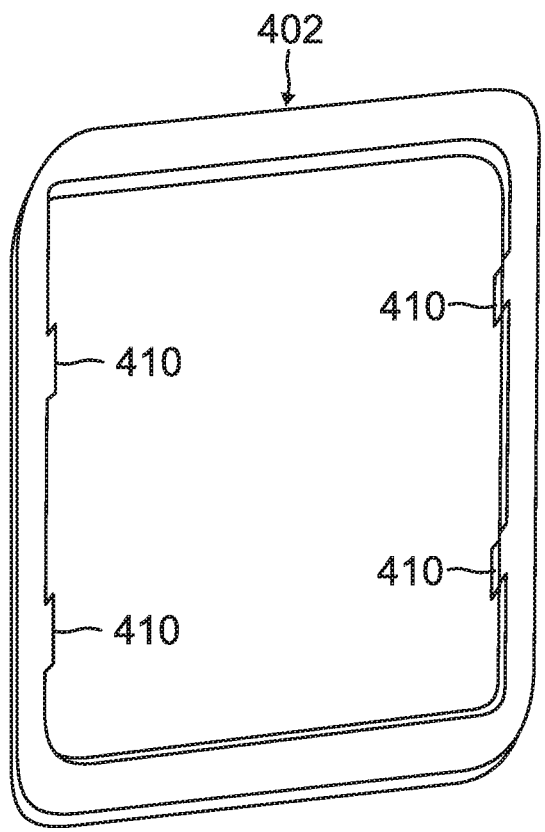
FIG. 3C is a top view of the frame of FIG. 2C.
Figure 3D:
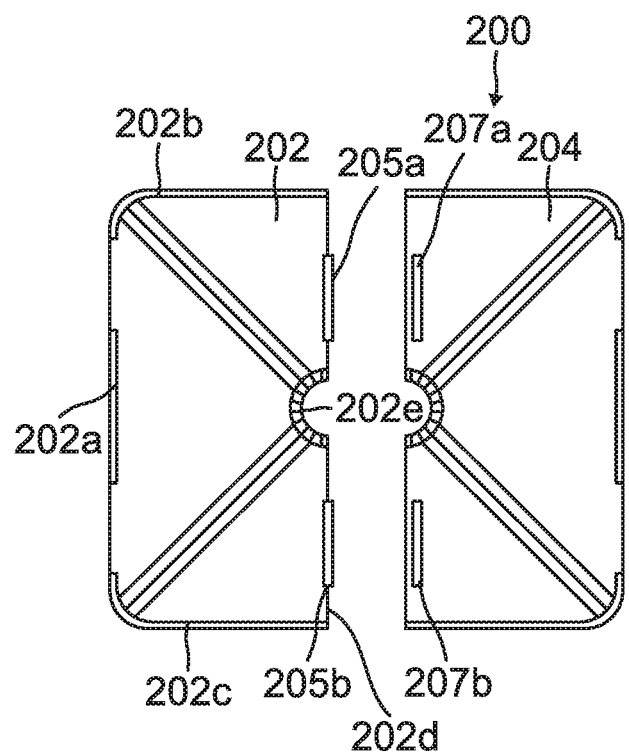
FIG. 3D is a top view of tray portions being aligned to be couple together to form a tray assembly in one exemplary embodiment.

An example of an attachment of a tray portion in embodiment is further illustrated in FIGS. 3A and 3B. In particular, the Figures illustrate a tray portion 202 of a tray assembly 200 (best shown in FIG. 3D) being lined up to be attached to frame 402. In this example, tray attaching tabs 412 are aligned with the tray retaining slots 410 of the frame 402. In an embodiment, the tray attaching tabs 412 are held within the tray retaining slots 410 of the frame 402 to hold the tray portions 202 in a static position in relation to the frame 402. FIG. 3C further illustrates the tray retaining slots of frame 402 in a top view of a frame 402. FIG. 3D illustrates how two tray portions 202 and 204 are put together in an embodiment to form the tray assembly 200. This example illustrates a first tray portion 202 having a first edge 202a, a second edge 202b, and third edge 202c and a fourth edge 202d. Extending from the fourth edge 202d are two spaced plate connecting tabs 206a and 206b. In this example, the fourth edge of tray portion 202 include a central semicircular cutout section 202e that is positioned between the first and second plate connecting tabs 206a and 206b. The second tray portion 204 has a similar arrangement, however, instead of the plate connecting tabs 206a and 206b, it includes plate connecting slots 207a and 207b that selectively receive the first and second plate connecting tabs 206a and 206b of the first tray portion 202 to form the tray assembly when positioned on the frame 402. The semicircular cutout sections in the first and second tray portions 202 and 204 form a central plant opening in this example embodiment.

Figure 5A:
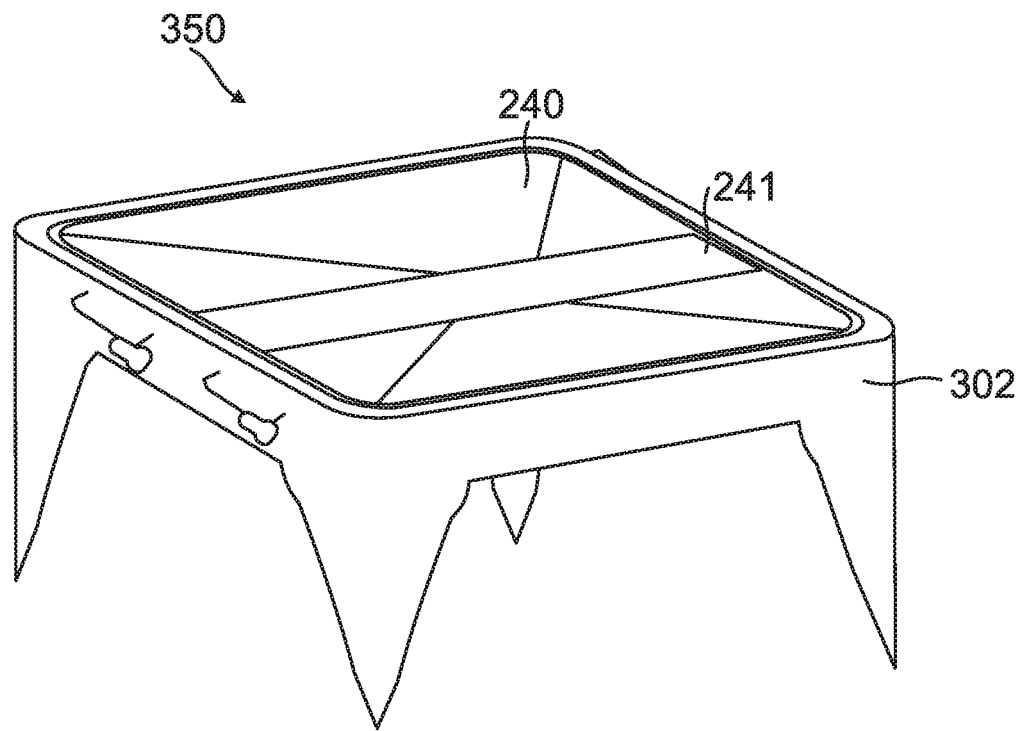
FIG. 5A is a side perspective view of tray assembly of FIG. 4D attached to the frame of FIG. 2B.
Figure 5B:
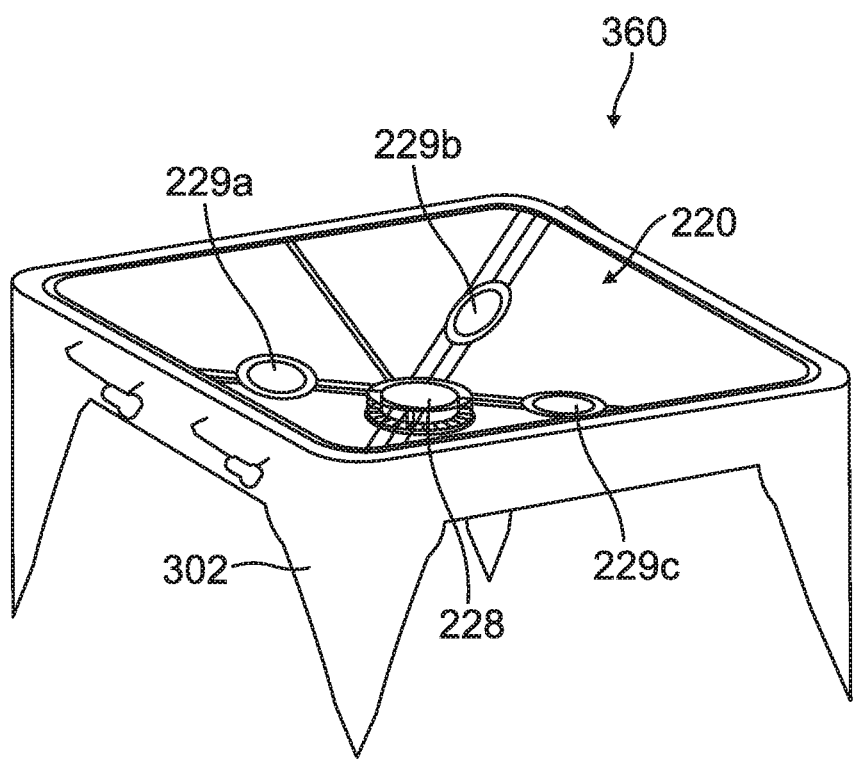
FIG. 5B is a side view of tray assembly of FIG. 4B attached to FIG. 5B.

FIGS. 4A through 4D illustrate top views of different example designs for the tray assemblies. In particular, FIG. 4A illustrates tray assembly 200 with the central plant opening (or passage) discussed above. FIG. 4B illustrates a tray assembly 220 with four tray portions 220, 222, 224 and 226 that form five plant openings. In this example, each tray portion 220, 222, 224 and 226 is wedge shaped. Tray portion 220 includes a first outer edge 220a, a second edge 220b, an inner edge 220c and a third edge 220d. The inner edge 220c is semicircular shaped in this example. The second edge 220b include a first semicircular cutout 221a and fourth edge 220d includes a second semicircular cutout 221b. Tray portion 222 includes a first outer edge 222a, a second edge 222b, an inner edge 222c and a third edge 222d. The inner edge 222c is semicircular shaped in this example. The second edge 222b include a first semicircular cutout 223a and fourth edge 222d includes a second semicircular cutout 223b. Tray portion 224 includes a first outer edge 224a, a second edge 224b, an inner edge 224c and a third edge 224d. The inner edge 224c is semicircular shaped in this example. The second edge 224b include a first semicircular cutout 225a and fourth edge 224d includes a second semicircular cutout 224b. Tray portion 226 includes a first outer edge 226a, a second edge 226b, an inner edge 226c and a third edge 226d. The inner edge 226c is semicircular shaped in this example. The second edge 226b include a first semicircular cutout 227a and fourth edge 226d includes a second semicircular cutout 227b. The inner edges 220c, 222c, 224c and 226c form a central plant opening 228 (best illustrated in FIG. 5B). Cutout section 221a and cutout section 222b form a first plant opening. Cutout section 223a and 225b form a second plant opening 229a (best illustrated in FIG. 5B). Cutout section 225a and cutout section 227b form a third plant opening 229b. Cutout section 227a and cutout section 221b form a fourth plant opening 229c. FIG. 5B illustrates a growing system 360 with tray assembly 220 attached to frame 302. This tray assembly would be used with plants that can be planed close together but yet require some separation.

FIG. 4C illustrates tray assembly 230. As illustrated, tray assembly 230 includes a first tray portion 232 and a second tray portion 234. The first tray portion 232 includes a first outer edge 232a, a second outer edge 232b an inner edge 232c and a third outer edge 232d. Along the inner edge 232c of this example embodiment extends a pair of spaced holding tabs 235a and 235b. Moreover, the inner edge 232c include a central semicircular cutout section 233. The second tray portion 234 includes a first outer edge 234a, a second outer edge 234b an inner edge 234c and a third outer edge 234d. The inner edge 234c include a central semicircular cutout section 237 which forms with cutout section 231 of the first tray portion 232 the central plant opening 231 (best illustrated in FIG. 1). The spaced holding tabs 235a and 235b of the first tray portion 232 engage the second tray portion 234 proximate the inner edge 234c to stabilize the tray assembly 230 when positioned on a respective frame, such as frame 102 illustrated in FIG. 1.

FIG. 4D illustrates another example embodiment of a tray assembly 240. In this example embodiment the plant opening 241 is a rectangular passage that extends along a width of an interior opening of a frame. The tray assembly 240 includes a first tray 242 and a second tray 244 that are spaced apart from each other when placed within a respective frame. For example, referring to FIG. 5A, tray assembly 240 is illustrated being positioned within frame 302 to form growing system 350. In FIG. 4D, this example embodiment is illustrated as having the tray portions 242 and 244 formed by three panels. For example, tray portion 242 includes panels 242a, 242b and 242c and tray portion 244 includes panels 244a, 244b and 244c. The panel configuration in this example embodiment allows for a select slope (rise over run) from an outer edge of the tray portion to and inner edge of the tray portion when tray portion is position on a select frame to either direct water towards or away from a plant passage as discussed further below. The relatively long plant passage 241 may be used for plants that are to be positioned right next to each other. The placement of plant passages in tray assemblies allow for the working of growing medium in precise locations for planting seeds or planting sets.

FIGS. 4E through 4G further illustrate top views of other example embodiments of growing systems 250, 260 and 270. They illustrate that the growing systems do not have to be square in shape. In FIG. 4E a first example of a tray assembly including first and second tray portions 252 and 254 positioned on a frame is illustrated. The tray portions 252 and 254 in this embodiment form a single central plant opening 251. Similarly, FIG. 4G illustrates a larger growing system 270 with two large tray portions 272 and 274 positioned on a frame such that a long central plant opening 251 is formed. FIG. 4F illustrates an example embodiment of a growing system 260 where three tray portions 262, 264, 266 are positioned on a frame to form two rows of plant openings 261 and 263. Hence, different configurations of growing systems are contemplated.

In some example embodiments, the tray assemblies are transparent and in other embodiments they are made of different colors. Hence, different color tray portions may be used with associated frames. For example, the color of the tray portions can be selected based on the type of plant to be grown. It has been shown that specific plants grow better in response to specific colors. Moreover, the colors can be selected to indicate the type of plant being grown.

Figure 6A:
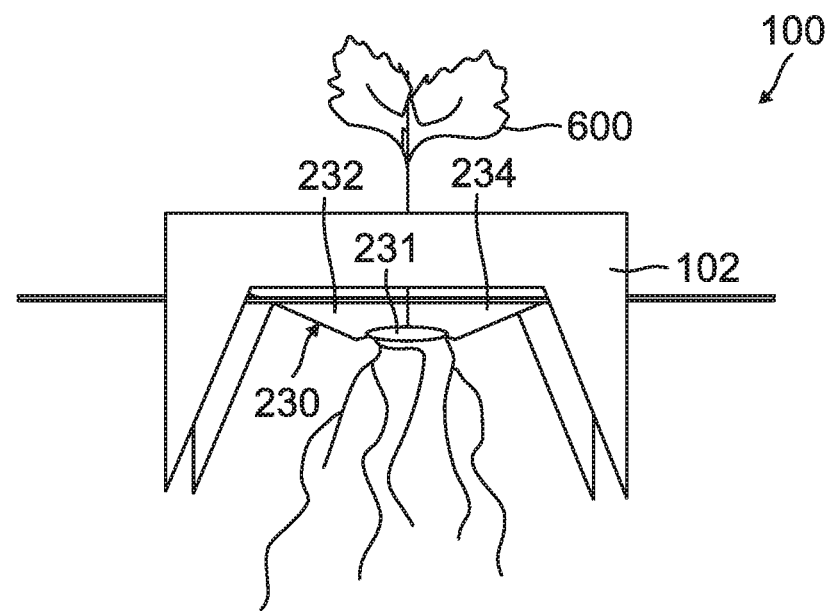
FIG. 6A is a side perspective view illustrating a tray assembly of FIG. 4C positioned in first orientation in relation to a frame to direct moisture towards a plant.
Figure 6B:
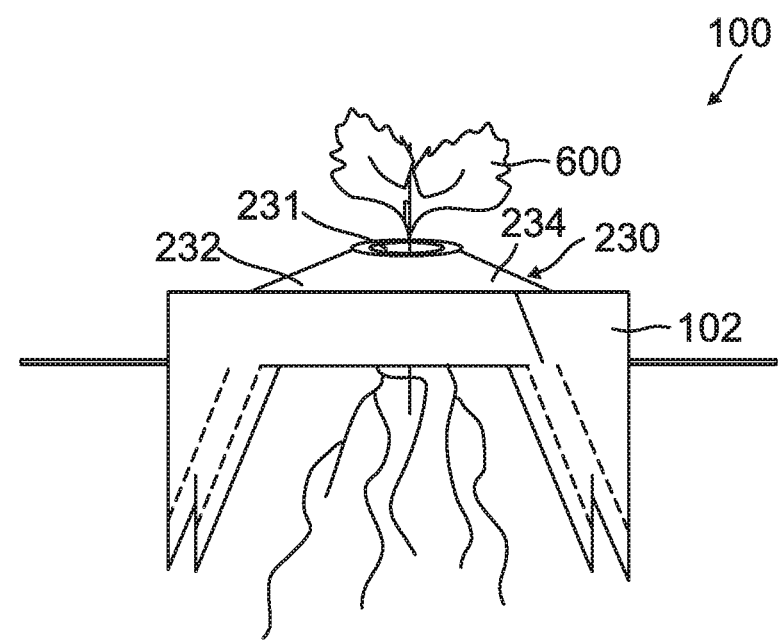
FIG. 6B is a side perspective view illustrating a tray assembly of FIG. 4C positioned in second orientation in relation to a frame to direct moisture away from the plant.

One feature of some embodiments is that tray assemblies can be inverted. For example, referring to the side perspective view of FIG. 6A, the growing system 100 is illustrated with the tray assembly 230 in a first configuration. In the first configuration, water is directed towards the plant opening 231. That is the tray panels 232 and 234 that make up the tray assembly are formed to have a slope. In the first configuration the slope directs any water towards the plant opening 231 to the plant 600. The second configuration is illustrated in FIG. 6B. In the second configuration the tray panels are flipped over so that the slope goes from the plant opening 231 down to the edges of the frame 102. Hence, in the second configuration, water would be directed away from the plant 600. The second configuration may be used if the ground around the plant 600 is oversaturated. This second configuration enables the growing system 100 to direct any water (from rainfall, watering, condensation, etc.) away from the plant 600 if desired. Hence at least in some embodiments the tray panels can be inverted (flipped over) to opposably change the slope of the tray assembly.

FIG. 7A illustrates the use of growing system 100 with plant 600. Plant 600 is a plant that requires room between it and the next plant. For example, plant 600 may be a tomato plant. FIG. 7B illustrates growing system 360 with multiple plants 620. Plants 620 can be positioned closer together than plant 600. For example, plants 620 could be some kind of a squash or melon plant. Finally, FIG. 7C illustrates the use of growing system 350 with plants 630. Plants 630 may be planted right next to each other in a row. For example, plants 630 may be carrot, radishes or peas.

Figure 8A:
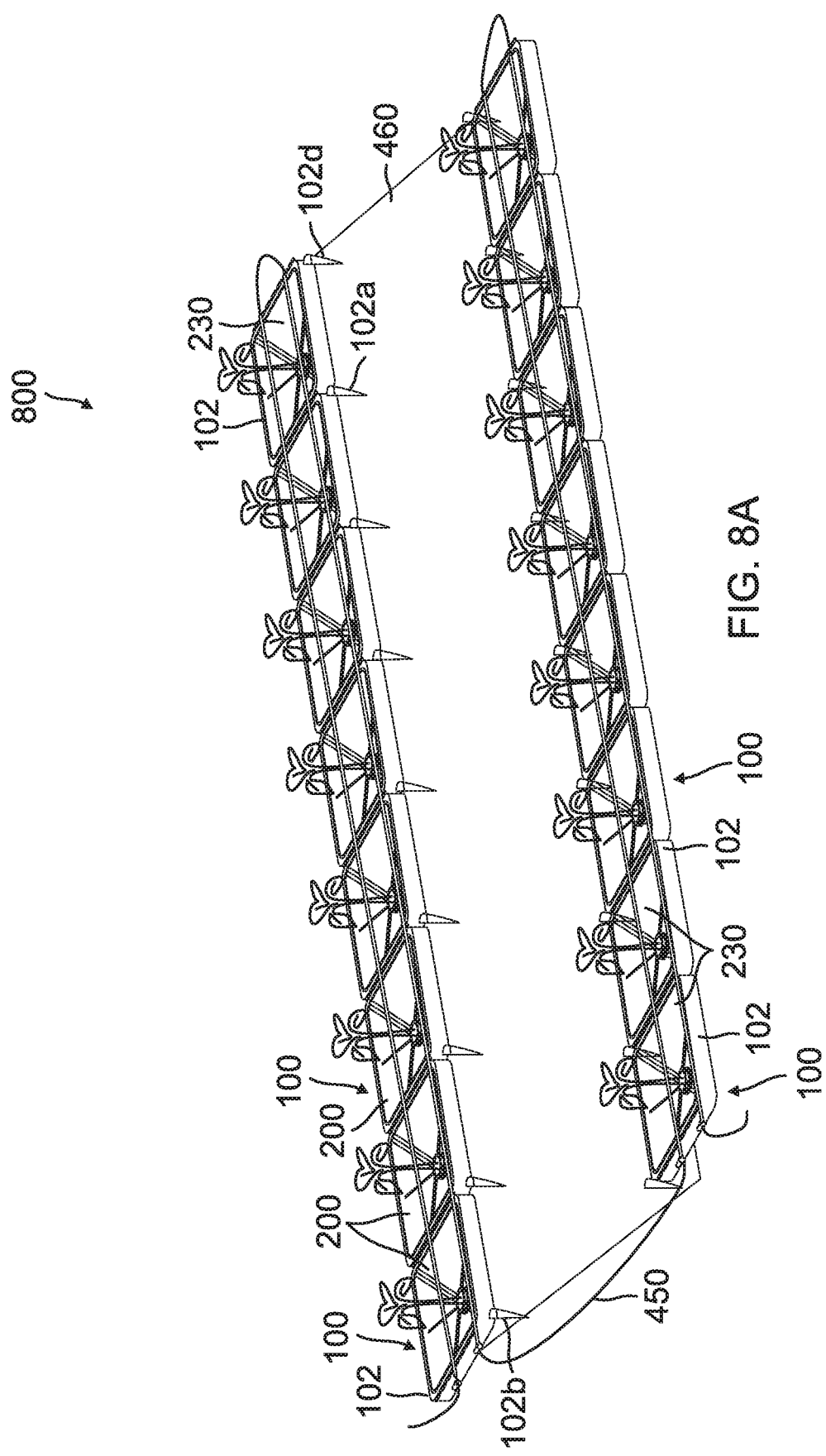
FIG. 8A is a side perspective view of an implementation of growing systems in an exemplary embodiment.

Referring to FIG. 8A, the use of a plurality of growing systems 100 connected together is illustrated. This illustration shows the formation of two rows separated by weed suppression material (weed barrier material) such as a weed fabric. The growing system 100 have their frames 102 connected together in each row as discussed above. One feature of the design is that the legs 102b of the frames 102 can be used to pass through the weed barrier 460 therein keeping the weed barrier in place. The weed suppression material may use a Kevlar® thread to reinforce it. Moreover, in an embodiment, the weed suppression material 460 is walking path material having openings through which the legs of the frame are received. Also illustrated in 8A is a soaker hose 450 which is routed through the plurality of frames 102 of the growing systems 100.

Figure 8B:
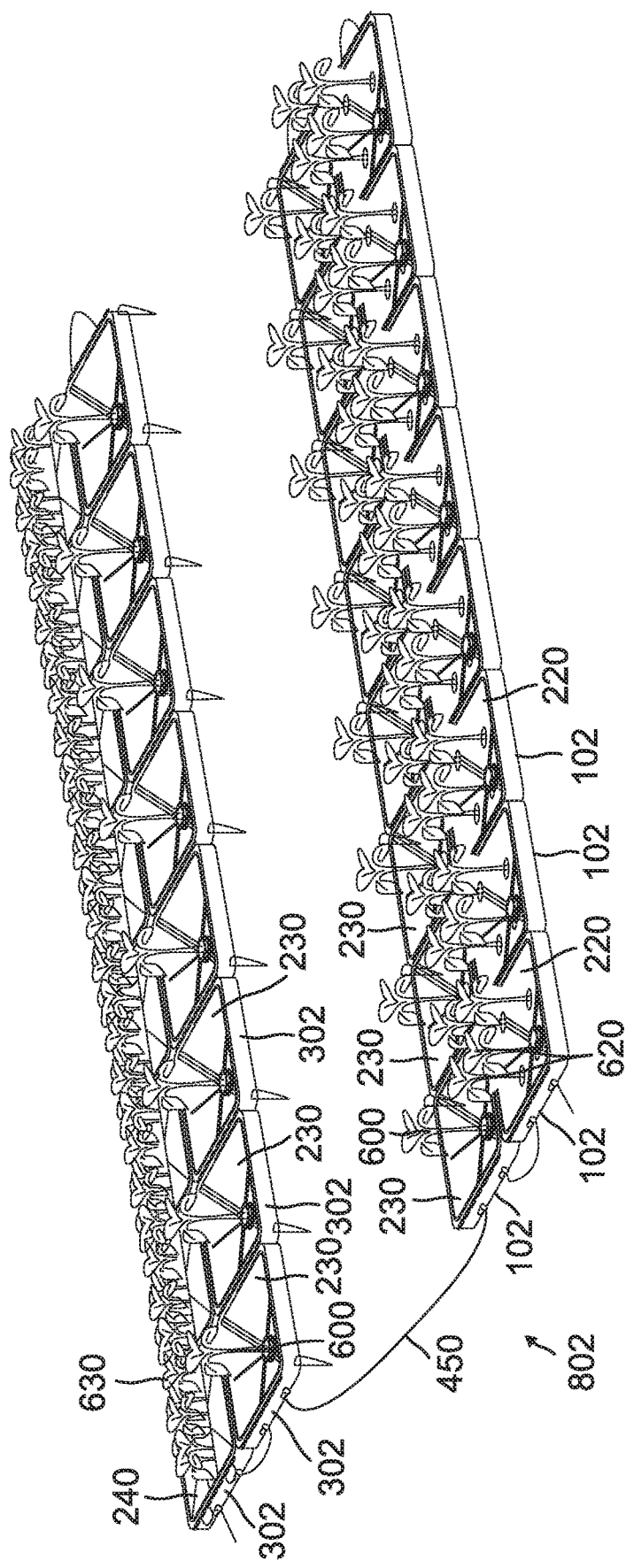
FIG. 8B is a side perspective view of another implementation of a growing systems in an exemplary embodiment.

FIG. 8B illustrates yet another example of how growing systems can be coupled together. In this example two rows are formed. Each row is two growing systems wide. Moreover, as illustrated, the flexibility of the system allows for two different types of tray assemblies to be used next to each other. In particular, growing systems with frames 302 and tray assemblies 230 and 240 are used in the first row where plants 600 and 240 are placed next to each other. In the second row frames 102 with tray assemblies 220 and 230 are used where plants 600 and plants 620 are placed next to each other. In embodiments, the respective frames 102 and 103 may have respective connection members on two or more sides to enable connections in different directions. Moreover, each side of a frame may include water hose passages so the water hose can be routed in different directions.

Figure 9:
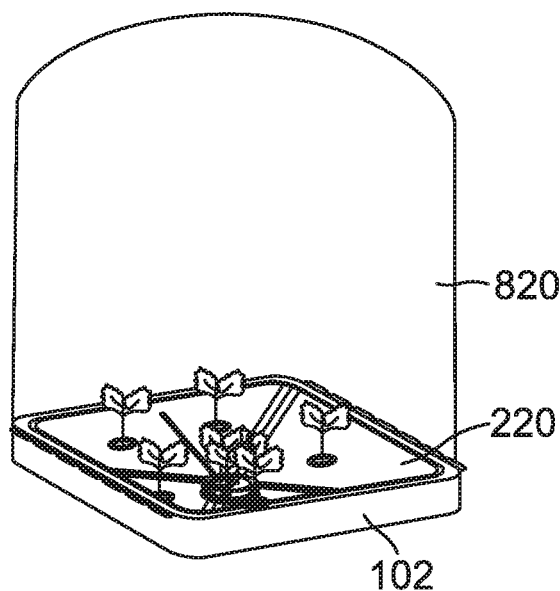
FIG. 9 is a side perspective view of a growing system with a growing cover of an exemplary embodiment.
Figure 10A:
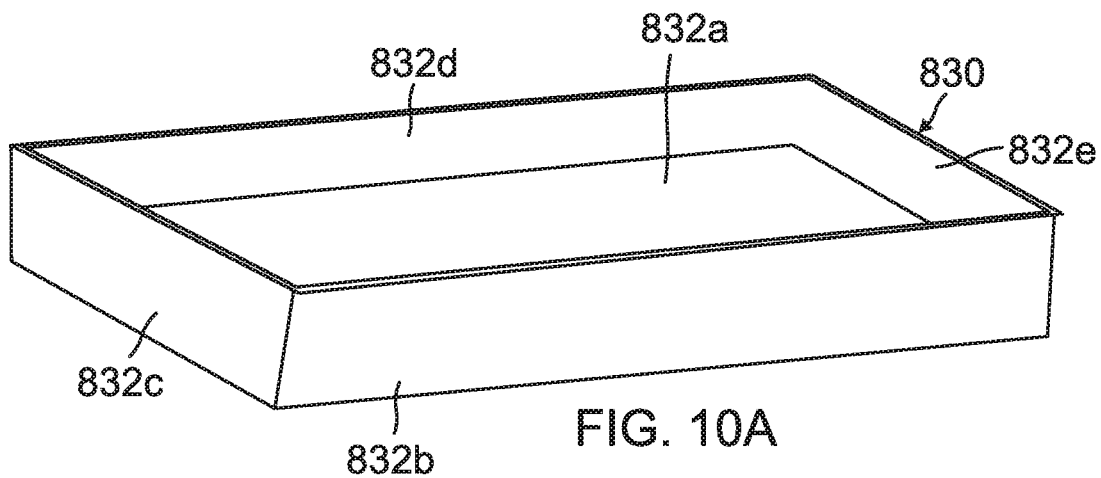
FIG. 10A is a side perspective view of a frame of yet still another exemplary embodiment.
Figure 10B:
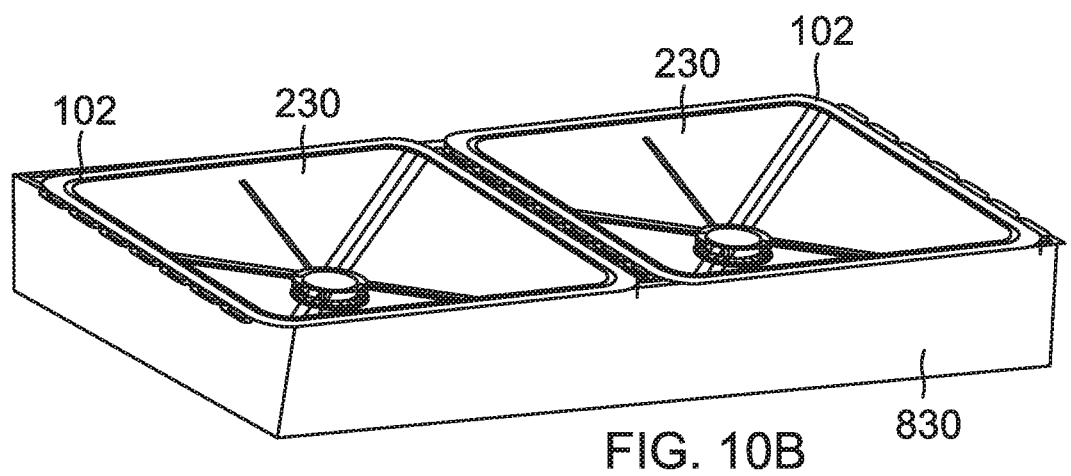
FIG. 10B is a side perspective view of two tray assemblies of FIG. 4c attached with the frame of FIG. 10A.

In an embodiment, a growing cover 820 is designed to be attached to a frame, such as frame 102. This is illustrated in FIG. 9. The growing cover 820 acts as a mini greenhouse for the plants. Any type of material that provides functions of a greenhouse can be used. In one embodiment the growing cover is a semi-transparent dome. In an embodiment, the growing cover 820 includes at least one open air side. Moreover in one embodiment the growing cover may include a portion that is transparent while at least one other portion is not to accommodate plants requiring partial shading such as, but not limited to *ginseng*. Further in another embodiment that includes at least one open air side, the growing cover 820 is made from a material that provides shade. FIG. 10A illustrates another embodiment of a frame 830. In this embodiment, the frame 830 generally includes a bottom 332a and four sidewalls 832b, 832c, 832d and 832e. In this embodiment, the frame 830 is designed to hold the growing medium, such as but not limited to, soil. Moreover in this example embodiment, two tray assemblies 230 can be used with one frame 830 as illustrated in FIG. 10B.

Figure 11A:
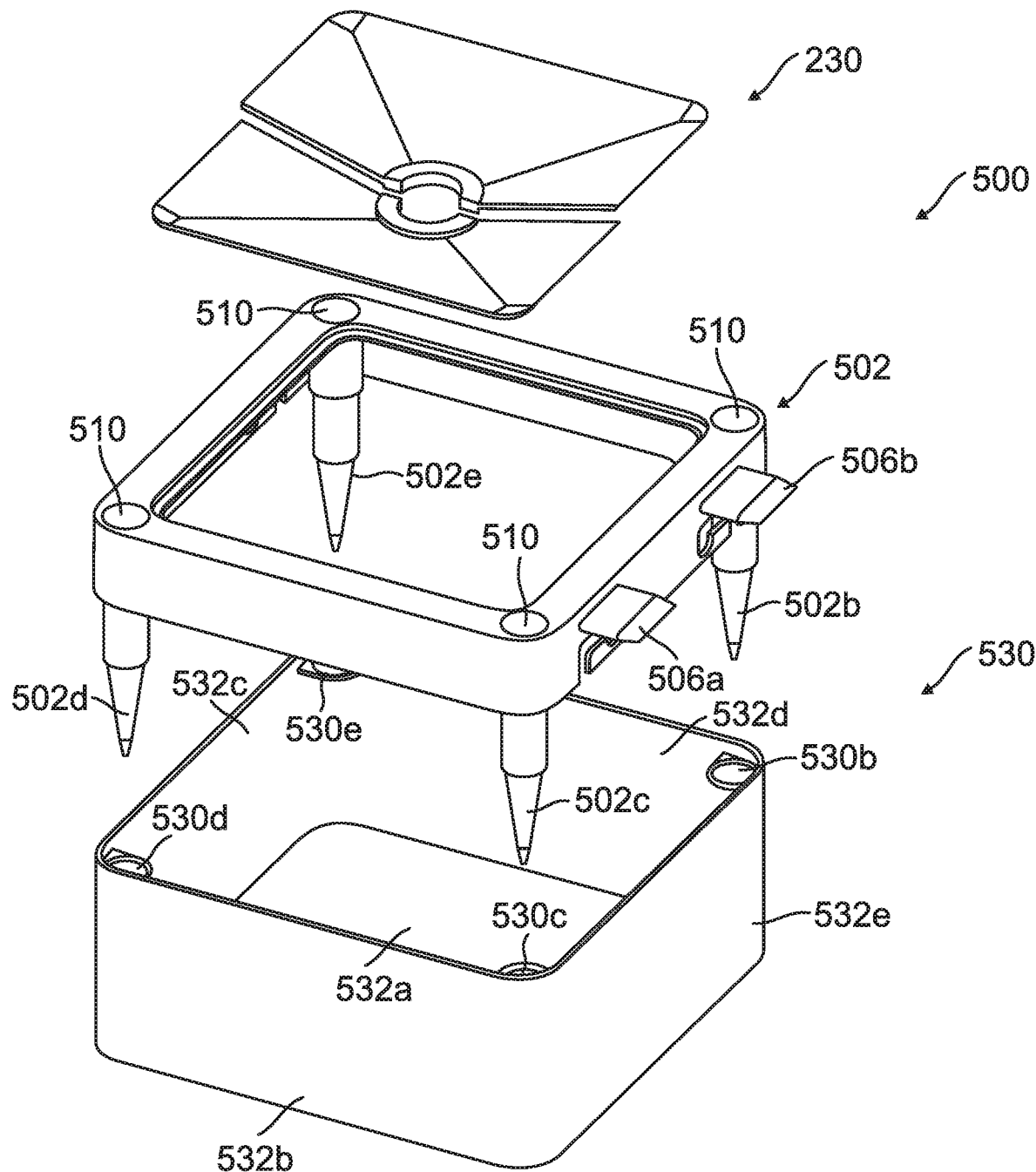
FIG. 11A illustrates an exploded side perspective view of a growing system of yet another exemplary embodiment.
Figure 11B:
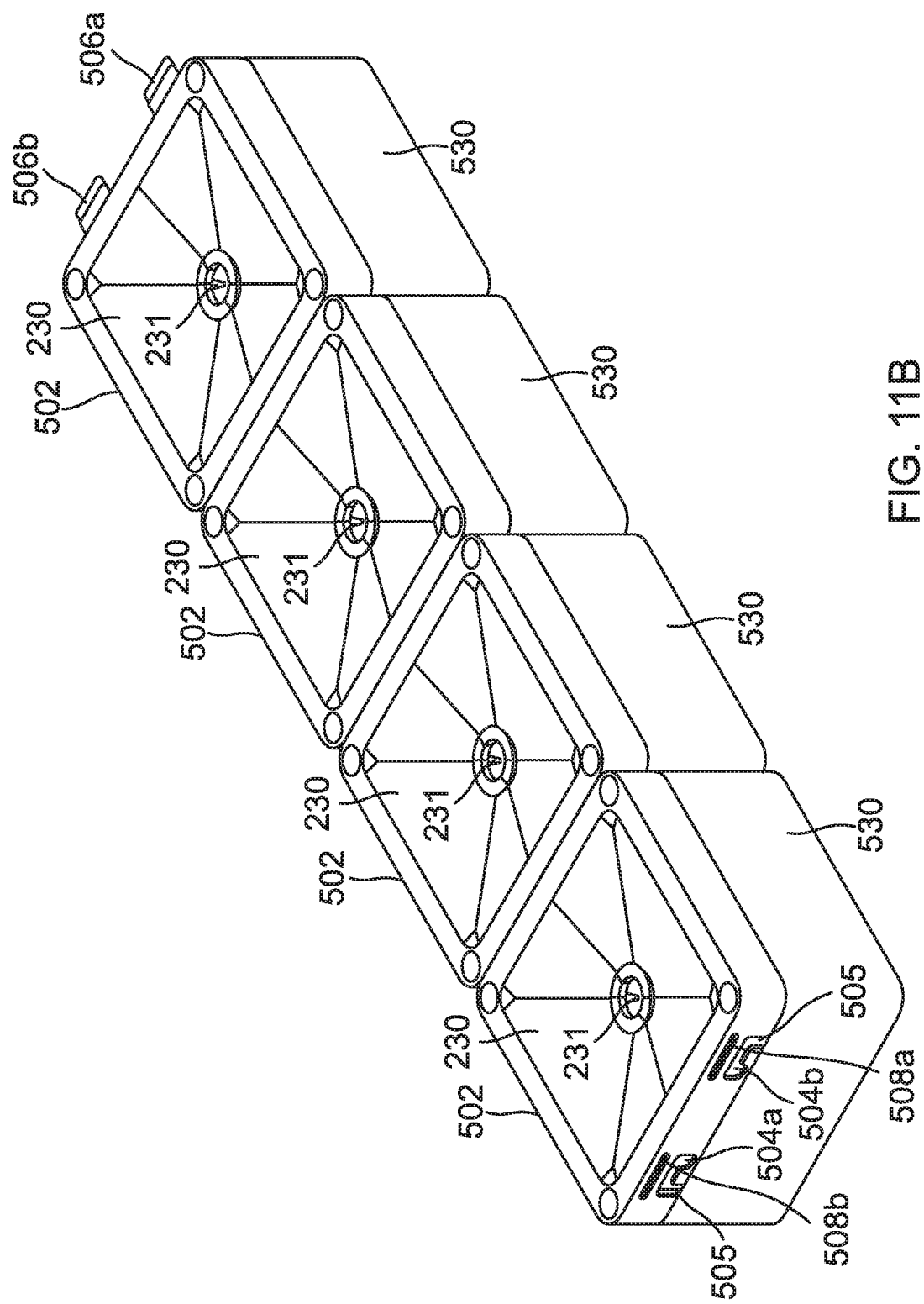
FIG. 11B is a side perspective view of a plurality of the growing system of FIG. 11A coupled together.
Figure 11C:
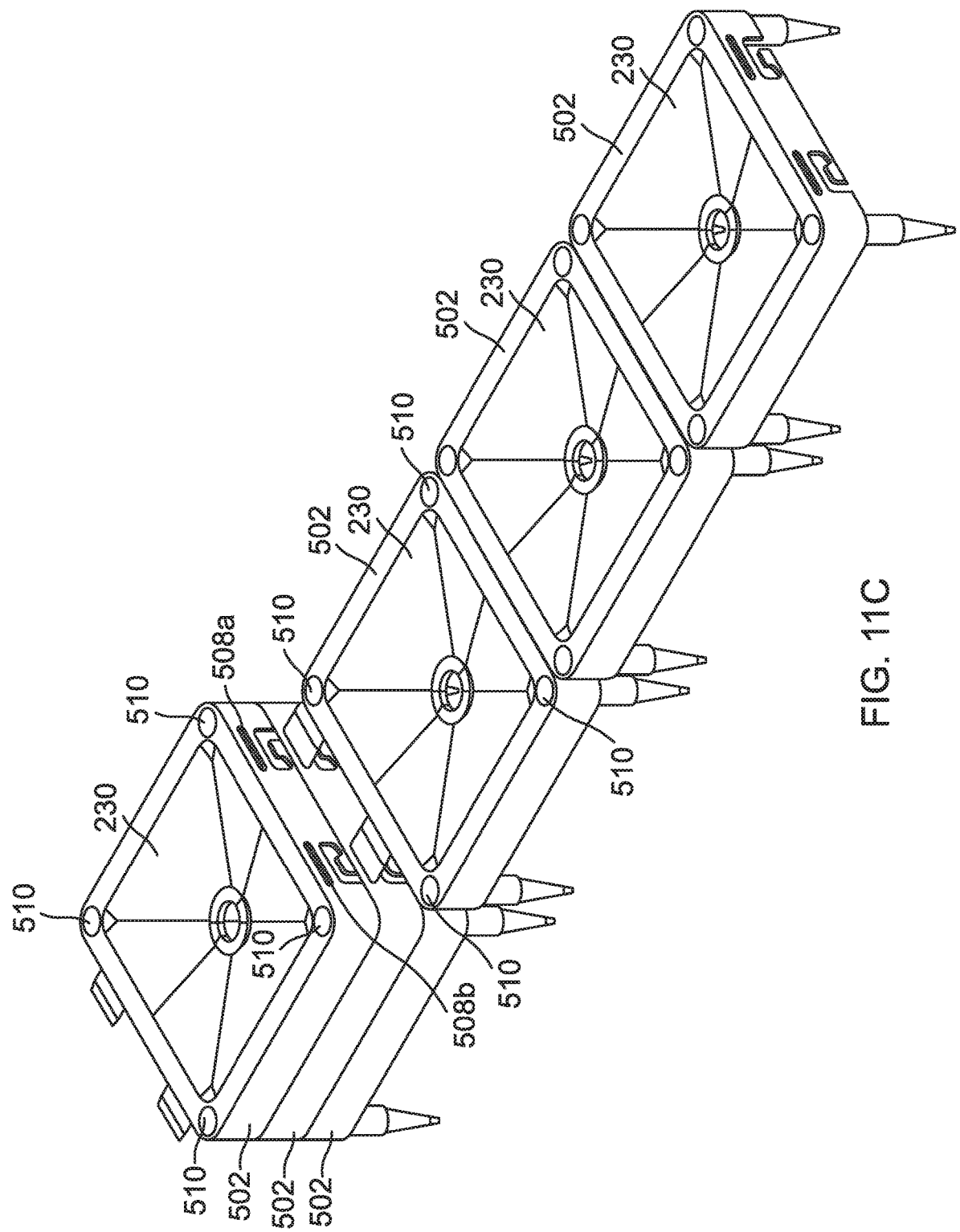
FIG. 11C illustrates a side perspective view of the frames of FIG. 2D being attached and stacked in an exemplary embodiment.

Another example embodiment if a growing system 500 is illustrated in FIG. 11A. In this embodiment the growing system 500 may include a frame container 530. The frame container 530 includes a bottom 532a and four side walls 532b, 532c, 532d and 532e. The frame container 530 is designed to hold the growing medium. The frame container 530 further includes frame guides 530b, 530c, 530d and 530e in an example embodiment. Legs 502b, 502c, 502d and 502e are designed to be received in the frame guides 530b, 530c, 530d and 530e to help retain the frame 502 within the frame container 530. FIG. 11B illustrates how a plurality of growing systems 500 are coupled together by their frames 502. FIG. 11c illustrates how the frames can be stacked on each other by inserting the legs 502b, 502c, 502d and 502e in the stacking bores 110 in the frames 502 as discussed above.

Example Embodiments

Example 1 is a garden layout growing system. The system includes a frame and at least a first tray and a second tray. At least one leg extends from the frame. The at least one leg is configured to be received within a growing medium to hold the frame at a select location in relation to the growing medium. Each first and second tray has at least a portion of a first edge that forms at least a portion of at least one plant opening and at least at portion of a second edge that is configured and arranged to be removably attached to the frame.

Example 2, includes the garden layout growing system of Example 1, wherein each of the first and second tray is configured to be removably attached to the frame in a first configuration and a second configuration. The first configuration is configured to direct moisture towards the at least one plant opening and the second configuration configured to direct moisture away from the at least one plant opening.

Example 3 includes the garden layout growing system of any of the Examples 1-2, wherein the first configuration has a desired slope to the at least one plant opening and the second configuration has a desired slope away from the at least one plant opening.

Example 4 includes the garden layout growing system of any of the Examples 1-3, wherein the at least first and second trays have a color selected for a specific plant.

Example 5 includes the garden layout growing system of any of the Examples 1-4, wherein the at least first and second trays are configured and arranged to be replaced.

Example 6 includes the garden layout growing system of any of the Examples 1-5, wherein the frame has a first type connection member and a second type connection member. The first type of connection member configured to engage the second type connection member on another frame to selectively couple the frame to the another frame.

Example 7 includes the garden layout growing system of any of the Examples 1-6, wherein the frame includes at least one watering hose passage that is configured to allow a water hose to pass under at least one of the at least first and second trays.

Example 8 includes the garden layout growing system of Examples 7, wherein the at least one watering hose passage has a reduced section that is configured to hold the water hose in a static position in relation to the frame.

Example 9 includes the garden layout growing system of any of the Examples 1-8, wherein the at least one plant opening is one of a circle, a single rectangle and a double rectangle.

Example 10 includes the garden layout growing system of any of the Examples 1-9, wherein the frame has at least one interior track that is configured and arrange to selectively hold the at least a portion of the second edge of the at least first and second tray panels.

Example 11 includes the garden layout growing system of any of the Examples 1-10, further including a frame container configured to hold the growing medium.

Example 12 includes the garden layout growing system of the Example 11, wherein the frame container includes at least one frame guide that is configured and arranged to receive the at least one leg.

Example 13 includes the garden layout growing system of any of the Examples 1-12, wherein the frame includes at least one stacking bore that configured and arranged to receive at least one leg of another frame when the frame is stacked together with the another frame during storage.

Example 14 is a garden layout growing system including a frame and a tray assembly. At least one leg extends from the frame. The at least one leg is configured to be received within a growing medium to hold the frame at a select location in relation to the growing medium. The tray assembly has at least one plant opening. The tray assembly has an outer edge that is configured and arranged to be selectively attached to the frame. The tray assembly has a slope between the outer edge to the at least one plant opening when attached to the frame. The tray assembly is configured and arranged to have a first configuration and a second configuration when attached to the frame. The first configuration causes moisture to be directed towards the at least one plant opening and the second configuration causes the moisture to be directed away from the at least one plant opening.

Example 15 includes the garden layout growing system of Examples 14, wherein the tray assembly further includes at least a first tray and a second tray. Each first and second tray has at least a portion of a first edge that forms at least a portion of the at least one plant opening and at least at portion of a second edge that is configured and arranged to form at least a portion of the outer edge of the tray assembly.

Example 16 includes the garden layout growing system of any of the Examples 14-15, wherein the frame has a first type connection member and a second type connection member. The first type of connection member is configured to engage a second type connection member on another frame to selectively couple the frame to the another frame.

Example 17 includes the garden layout growing system of any of the Examples 14-16, wherein the frame includes at least one watering hose passage that is configured to allow a water hose to pass under the tray assembly.

Example 18 is a tray assembly for a garden layout growing system, the tray assembly includes at least a first tray and at least a second tray. Each first and second tray has at least a portion of a first edge that forms at least a portion of at least one plant opening and at least at portion of a second edge that is configured and arranged to be selectively coupled to a frame.

Example 19 includes the tray assembly for a garden layout growing system of Example 18, wherein the tray assembly is configured and arranged to have a first configuration and a second configuration when attached to the frame. The first configuration causes moisture to be directed towards the at least one plant opening and the second configuration causes the moister to be directed away from the at least one plant opening.

Example 20 includes tray assembly of the garden layout growing system of any of the Examples 18-19, wherein the at least one plant opening is one of a circle and at least one rectangle.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A garden layout growing system, the system comprising:
   a frame including a frame base defining an inner frame opening, a plurality of legs extending from a bottom edge of the frame base of the frame, the plurality of legs configured to be received within a growing medium to hold the frame at a select location in relation to the growing medium; and
   at least a first tray and a second tray, each first and second tray having at least a portion of a first edge forming at least a portion of at least one plant opening and at least at portion of a second edge configured and arranged to be removably attached to the frame, wherein the at least first and second trays are configured to at least partially cover the inner frame opening of the frame base of the frame when the at least first tray and second tray is attached to the frame;
   wherein each of the first and second tray is configured to be removably attached to the frame in a first configuration and a second configuration, the first configuration configured to direct moisture towards the at least one plant opening and the second configuration configured to direct moisture away from the at least one plant opening;
   wherein the first configuration has a desired slope extending from the second edge of each tray to an associated first edge of the tray to the at least one plant opening and the second configuration has a desired slope extending from the first edge of each tray to an associated second edge of the tray away from the at least one plant opening; and, wherein the frame has at least one interior track that is configured and arrange to selectively hold the at least a portion of the second edge of the at least first and second tray panels.

2. The garden layout growing system of claim 1, wherein the at least first and second trays have a color selected for a specific plant.

3. The garden layout growing system of claim 1, wherein the at least first and second trays are configured and arranged to be replaced.

4. The garden layout growing system of claim 1, wherein the frame having a first type connection member and a second type connection member, the first type of connection member configured to engage a second type connection member on another frame to selectively couple the frame to the another frame to expand a designated planting area.

5. The garden layout growing system of claim 1, wherein the frame includes at least one watering hose passage configured to allow a water hose to pass under at least one of the at least first and second trays.

6. The garden layout growing system of claim 5, wherein the at least one watering hose passage has a reduced section configured to hold the water hose in a static position in relation to the frame.

7. The garden layout growing system of claim 1, wherein the at least one plant opening is one of a circle, a single rectangle and a double rectangle.

8. The garden layout system of claim 1, further comprising:
    a frame container configured to hold the growing medium.

9. The garden layout system of claim 8, wherein the frame container includes a plurality of frame guides configured and arranged to receive the plurality of legs.

10. The garden layout system of claim 1, wherein the frame includes a plurality of stacking bores, each stacking bore in the frame configured to receive a leg of another frame when the frame is stacked together with the another frame during storage.

11. A garden layout growing system, the system comprising:
    a frame, at least one leg extending from the frame, the at least one leg configured to be received within a growing medium to hold the frame at a select location in relation to the growing medium; and
    a tray assembly having at least one plant opening, the tray assembly having an outer edge configured and arranged to be selectively attached to the frame, the tray assembly having a slope between the outer edge to the at least one plant opening when attached to the frame, the tray assembly configured and arranged to have a first configuration and a second configuration when attached to the frame, the first configuration causing moisture to be directed towards the at least one plant opening and the second configuration causing the moisture to be directed away from the at least one plant opening; and,
    wherein the tray assembly further comprises: at least a first tray and a second tray, each first and second tray having at least a portion of a first edge forming at least a portion of the at least one plant opening and at least at portion of a second edge configured and arranged to form at least a portion of the outer edge of the tray assembly; and,
    wherein the frame has an interior opening that is at least partially covered by the at least first and second trays in both the first and second configurations.

12. The garden layout growing system of claim 11, wherein the frame having a first type connection member and a second type connection member, the first type of connection member configured to engage a second type connection member on another frame to selectively couple the frame to the another frame.

13. The garden layout growing system of claim 11, wherein the frame includes at least one watering hose passage configured to allow a water hose to pass under the tray assembly.

\* \* \* \* \*